United States Patent [19]

Antic et al.

[11] Patent Number: 5,594,942
[45] Date of Patent: Jan. 14, 1997

[54] RESTORATION OF A HOME LOCATION REGISTER IN A MOBILE RADIO SYSTEM

[75] Inventors: Nenad Antic, Sollentuna; Walter Ghisler, Upplands Väsby, both of Sweden

[73] Assignee: Telefonaktiebolaget LM Ericsson, Stockholm, Sweden

[21] Appl. No.: 576,852

[22] Filed: Dec. 22, 1995

Related U.S. Application Data

[63] Continuation of Ser. No. 219,884, Mar. 30, 1994, abandoned.

[30] Foreign Application Priority Data

Mar. 31, 1993 [SE] Sweden ................. 93011076

[51] Int. Cl.⁶ ........................................... H04Q 7/00
[52] U.S. Cl. ........................ 455/33.1; 455/8; 455/53.1; 455/67.1; 377/59; 395/618; 395/615; 364/282.1
[58] Field of Search ................. 455/33.1, 53.1, 455/56.1, 67.1, 8, 9, 186.1; 379/59, 58; 395/600; 364/282.1

[56] References Cited

U.S. PATENT DOCUMENTS

| | | |
|---|---|---|
| 5,123,111 | 6/1992 | Delory et al. . |
| 5,136,707 | 8/1992 | Block et al. . |
| 5,274,802 | 12/1993 | Altine ......................... 455/33.1 |
| 5,343,477 | 8/1994 | Yamada ....................... 395/575 |
| 5,490,201 | 2/1996 | Moberg et al. ................ 379/58 |
| 5,546,574 | 8/1996 | Grosskopf et al. ............ 395/600 |

FOREIGN PATENT DOCUMENTS

WO93/25051 12/1993 WIPO .
WO94/04006 2/1994 WIPO .

OTHER PUBLICATIONS

Recommendation GSM 03.07—Version 3.2.1, "Restoration Procedures", ETSI/PT 12, Feb. 1992, pp. 8–9, sections 3.2.1 and 3.2.2.
Recommendation GSM 09.02—Version 3.8.0, "Mobile Application Part Specification DCS", ETSI, Jan. 1991, section 5.8.4, Procedures for Restoration of HLR, p. 275.

*Primary Examiner*—Chi H. Pham
*Assistant Examiner*—Doris To
*Attorney, Agent, or Firm*—Burns, Doane, Swecker & Mathis, L.L.P.

[57] ABSTRACT

A mobile telephone system with two home location register units mirroring each other is disclosed. In the event of a crash in one unit a backup copy is first loaded. Thereafter, records in the loaded backup copy that have changed after the latest position dump before the crash are updated with information from the other home location register unit, the mirror copy of which is updated after the position dump.

4 Claims, 4 Drawing Sheets

5,594,942

RESTORATION OF A HOME LOCATION REGISTER IN A MOBILE RADIO SYSTEM

This application is a continuation of application Ser. No. 08/219,884, filed Mar. 30, 1994, now abandoned.

TECHNICAL FIELD

The present invention relates to a method for restoring a home location register in a so called HLR unit in a mobile radio system, for instance a mobile telephone system, after the information in the HLR unit has been lost after a HLR crash. The invention also relates to a mobile radio system that does not block new calls in connection with a HLR crash and during the time period in which the crashed HLR unit is restored.

PRIOR ART

A HLR unit (HLR=Home Location Register) serves mobile services switching centers in a mobile telephone system. A mobile telephone system may comprise one or several such HLR units. Each HLR unit contains information regarding all the mobile telephone subscribers that belong to the geographic area that is covered by the mobile services switching centers connected to the HLR unit. This information is stored in a home location register. This data base contains a record for each connected subscriber in the mentioned geographic area. Each such record contains different types of subscriber information, for instance debiting information, available services, etc. Such information is called the subscribers categories. Each record also contains information on which mobile services switching center the subscriber currently is associated with, that is the "visited exchange" of the subscriber. This latter position information is required to enable redirection of incoming calls intended for the subscriber to the mobile services switching center in the coverage area of which the subscriber currently is located.

In order to prevent that the entire mobile telephone system is knocked out in the event of an HLR crash a backup copy of the home location register is saved at regular intervals, for instance once every 24 hours. The purpose of this is to enable restoration of the home location register after restart of the HLR unit in connection with a HLR crash. This works well as regards the category information of the subscribers, since this information seldom changes, but the position information is not reliable, since the subscribers may have moved (roaming) since the last backup copy was made before the HLR crash. Thus, the subscriber's "visited exchange" may have changed in the meantime. For this reason a so called position dump is made at shorter intervals, for instance every 15 minutes, so that position information is updated more often on the backup unit. However, even this time period is too long, since many subscribers may have changed "visited exchange" within this period.

In previously known mobile telephone systems this problem is solved by letting the HLR unit at restart transmit a message indicating unreliable position data to all mobile services switching centers connected thereto. These centers can then erase stored category information for visiting subscribers from this HLR unit. This results in that all active visiting subscribers from this HLR unit are forced to send a position update message to the mobile services switching center and further to the HLR unit within the next (periodic) registration interval (typically 20 minutes) after restart of the HLR unit. This enables the HLR unit to update all subscriber positions, so that incoming calls may be correctly redirected. Furthermore, the mobile services switching centers regain their category information, so that they may establish new outgoing calls.

This method, however, has several drawbacks.

During the crash there is no spare capacity for handling new calls. The entire mobile telephone system is therefore blocked for such calls. This can be very serious, especially if the crash is prolonged, for instance due to a catastrophe or sabotage in the crashed HLR unit.

More than half the available traffic capacity must be reserved for handling the extra load that arises when all subscribers update their positions, whereby the capacity of the HLR unit is significantly reduced.

The extra load that is induced in the HLR unit in connection with restart depends only on the number of currently active subscribers and the length of the periodic registration interval. These parameters cannot be controlled in an efficient way.

The restoration time is too long and hard to influence, since other factors, for instance the traffic handling capacity in the mobile services switching centers, is influenced by a change (reduction) of the length of the periodic registration interval.

It has also been discussed to use a standby HLR that is updated over high speed links. However, no satisfactory solution has been suggested as to how the normal HLR unit is to regain consistent data after a crash.

SUMMARY OF THE INVENTION

Thus, there is a need for a method for restoring a home location register, in which method the time for restoring the home location register can be made as short as possible and the traffic capacity of the HLR unit is utilized in a more efficient way. An object of the present invention is to provide such a method.

There is also a need for a mobile radio communication system that is not blocked for new calls in connection with a HLR crash, that is a system that has spare capacity in for instance catastrophe situations and therefore is not as sensitive to such crashes as previously known systems. The present invention provides such a system.

The characterizing features of the invention are apparent from the attached patent claims.

The present invention is based on the insight that only the records in the home location register that are no longer valid after loading of the backup copy have to be updated.

SHORT DESCRIPTION OF THE DRAWINGS

The invention, further objects and advantages obtained by the invention are best understood by reference to the following description and the accompanying drawings, in which:

FIG. 1 diagrammatically shows the structure of a mobile telephone system in accordance with the present invention;

PREFERRED EMBODIMENTS

The present invention will now be described with reference to a mobile telephone system, but it is appreciated that the same principles are generally applicable in all types of mobile radio communication systems.

The same reference designations are used for corresponding elements throughout the figures of the drawings.

Figure 1:
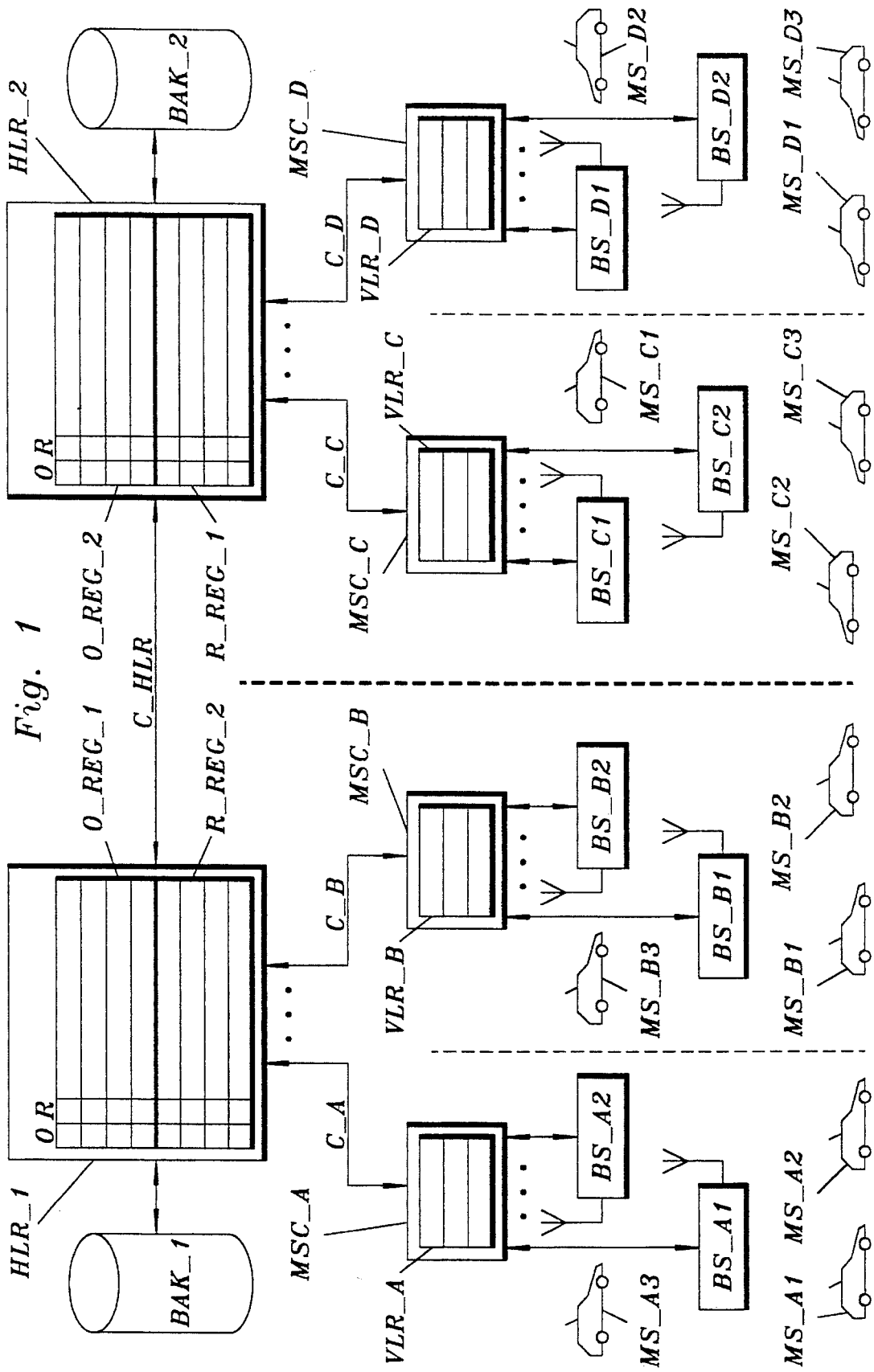

FIG. 1 diagrammatically shows the structure of a mobile telephone system. A HLR unit HLR_1 is connected to the mobile services switching centers MSC_A, . . . , MSC_D of the system. However, normally unit HLR_1 only serves the exchanges MSC_A, . . . , MSC_B over connections C_A, . . . , C_B. These exchanges in turn serve a number of base stations BS_A1, . . . , BS_A2 and BS_B1, . . . , BS_B2; respectively. The mobile services switching centers with their base stations serve respective geographic coverage areas. In the figure mobile services switching center MSC_A serves the geographic coverage area to the left of the thin dashed line in the left half of the figure, and mobile services switching center MSC_B serves the geographic coverage area to the right of the thin dashed line up to the thick dashed line in the middle of the figure. The base stations connected to mobile services switching center MSC_A communicate with a number of mobile stations MS_A1, . . . , MS_A3. In the same way the base stations connected to mobile services switching center MSC_B communicate with mobile stations MS_B1, . . . , MS_B3.

HLR unit HLR_1 contains a home location register, in which category information and dynamic information, for instance position information for all mobile stations that belong to the coverage areas of the mobile services switching centers connected to the HLR unit is stored. Furthermore, the HLR unit is connected to a backup unit BAK_1, in which a backup copy of the home location register is stored. The backup copy may for instance comprise a band station, a hard disc or RAM. At regular intervals, for instance once every 24 hours, a complete backup copy of the entire home location register is taken and stored on this backup unit BAK_1. At significantly shorter intervals, for instance every 15 minutes, a so called position dump of position data is made on the backup unit. In this way the backup may contain current position information for the mobile stations, that is information on which mobile services switching center they currently are associated with. The reason for this division is that the category information seldom changes, while the position information often changes.

When a mobile station leaves the coverage area of a mobile services switching center and enters the coverage area of another mobile services switching center, its category information is downloaded from the HLR unit into a visitor location register (VLR_A and VLR_B, respectively, in FIG. 1). This makes it possible to retrieve the category information of the mobile station from the visitor location register in the new mobile services switching center for establishing an outgoing call. Since the position information in the HLR unit has also been updated in connection with the movement between the coverage areas (roaming) the mobile station may also be reached by incoming calls.

The mobile telephone system of FIG. 1 also comprises a second HLR unit HLR_2, which is in contact with mobile services switching centers MSC_A, . . . , MSC_D. However, normally unit HLR_2 only serves exchanges MSC_C, . . . , MSC_D over connections C_C, . . . , C_D. These exchanges are in turn connected to base stations BS_C1, . . . , BS_C2 and BS_D1, . . . , BS_D2, respectively, which in turn communicate with mobile stations MS_C1, . . . , MS_C3 and MS_D1, . . . , MS_D3, respectively. HLR unit HLR_2 otherwise operates in the same way as HLR unit HLR_1.

When a mobile station leaves a mobile services switching center that is normally associated with unit HLR_1, for instance exchange MSC_B, and enters a mobile services switching center that normally is associated with unit HLR_2, for instance exchange MSC_C, unit HLR_1 establishes a connection also with this exchange. Thus, the mobile station is still associated with unit HLR_1, despite the fact that it now is located in an area normally handled by unit HLR_2. Thus, HLR_1 handles "its own" mobile stations regardless of where these stations are located. The same principle applies to unit HLR_2. It is in principle insignificant which mobile stations are associated with a certain HLR unit. However, for practical reasons it may be appropriate that a certain HLR unit is associated with mobile stations that normally are located in coverage areas of a certain subset of the total number of mobile services switching centers.

The data base in HLR unit HLR_1 comprises two parts, namely an operative register O_REG_1 and a redundance register R_REG_2. O_REG_1 contains the home location register of the mobile stations that belong to the coverage area of unit HLR_1, while R_REG_2 is a copy of the home location register of the mobile stations that belong to the coverage area of unit HLR_2. In the same way there is an operative register O_REG_2 and a copy of register O_REG_1, namely the redundance register R_REG_1, in HLR unit HLR_2. Unit HLR_1 handles the operative register $O_{13}$ REG_1 and the mobile stations that are associated therewith, while unit HLR_2 updates register R_REG_2 in unit HLR_1 over a direct connection C_HLR as this information is updated in its operative register O_REG_2. In the same way unit HLR_2 handles the operative register O_REG_2 and the mobile stations that are associated therewith, while unit HLR_1 updates register R_REG$_{13}$ 1 in unit HLR_2 over a direct connection C_HLR as the information in its operative register O_REG_1 is updated. It can be said that the HLR units "mirror" each other. It is to be noted that the connection C_HLR does not have to be a high speed link, but that a connection that communicates in accordance with the same standards as the mobile services switching centers is sufficient.

Figure 2:
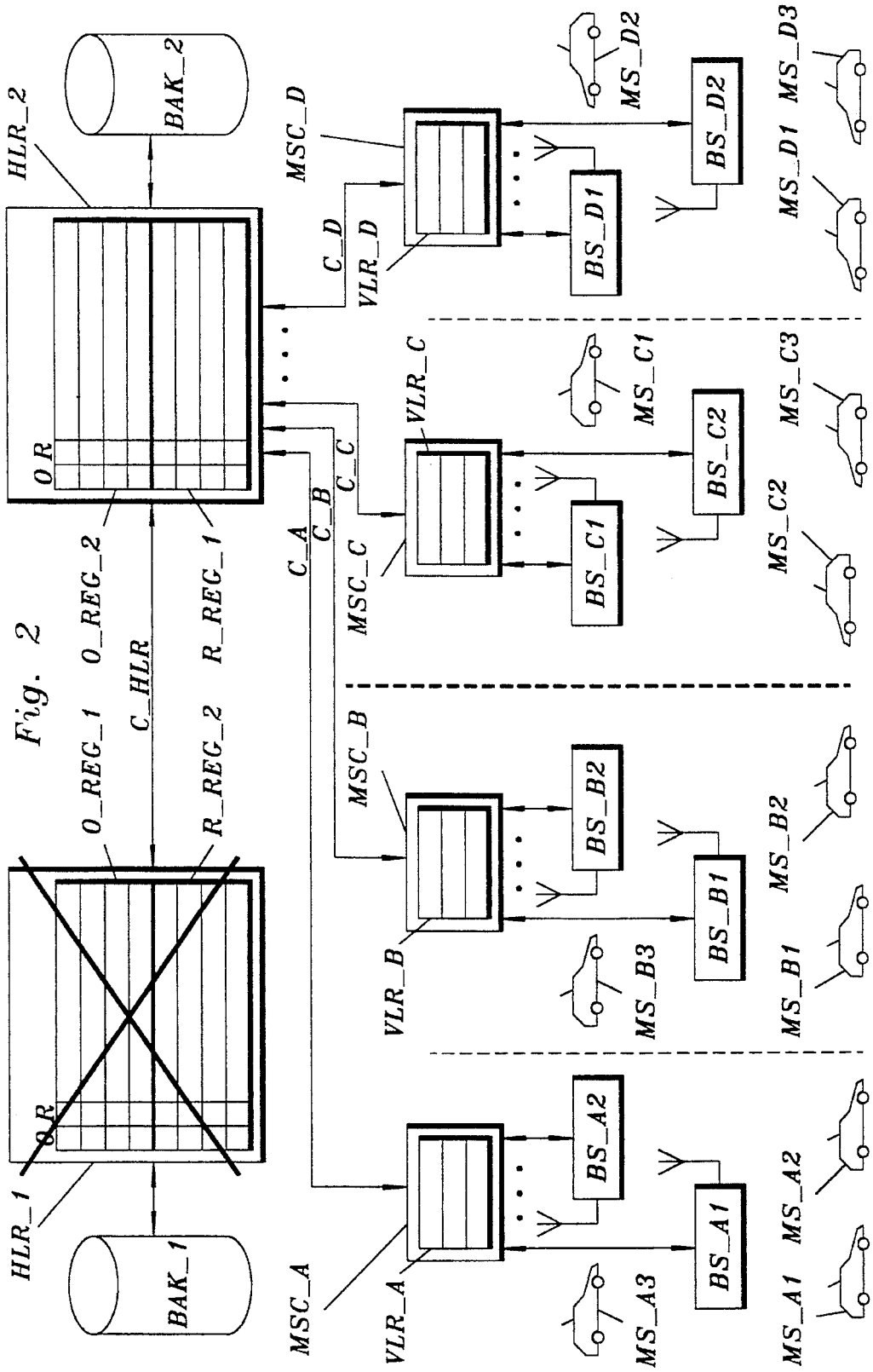
FIG. 2 shows the mobile telephone system in FIG. 1 after a HLR crash.

As has been mentioned above each HLR unit normally handles "its own" mobile stations. However, in case one HLR unit, for instance HLR_1, crashes or goes down its mobile stations have access to an alternative route to the other HLR unit, HLR_2 in this example. When unit HLR_1 can no longer be contacted, unit HLR_2 takes over the control from the crashed unit HLR_1. This situation is illustrated in FIG. 2. All the mobile stations that previously were controlled by HLR_1 will now be controlled by HLR_2. Unit HLR_2 may take over in this way due to the fact that it includes a current copy of the home location register of unit HLR_1. Unit HLR_2 will now handle both "its own" mobile stations and the mobile stations of unit HLR_1.

The records in the home location registers aside from the subscriber information also contain two tag fields, namely an operative tag O and a redundance tag R. Each time a HLR unit has performed a position dump it resets the redundance tags R in both registers of the mirrored unit, which indicates that a current backup copy of the corresponding records now exists. If a record is changed after a dump it is R tagged in both its own register and its mirror register. The R tag in the mirror register is cleared when a dump has been performed in the HLR unit that contains the operative register in which the record is included, while the R tag in the operative register is cleared when the mirrored HLR unit has performed a dump. It is also to be noted that the dumps do not have to be synchronized between the two HLR units.

When unit HLR_1 is busy loading a backup copy from backup unit BAK_1 after a crash and does not respond to calls from its mobile stations, a population of both O and R tagged records is instead built up in the redundance register R_REG_1 of unit HLR_2. During this time period all updated records are therefore tagged in both operative register O_REG_2 and redundance register R_REG_1 in unit HLR_2. Therefore unit HLR_2 will handle all subscriber information for the subscribers of both HLR units. The subscribers will not notice the crash, but can continue to initiate and receive calls as usual. This is a very important aspect of the invention, especially if the crash is due to an error that requires a long time to correct.

When unit HLR_1 has stored its backup copy it sends a message indicating unreliable data to unit HLR_2. When the latter has received this message it sends all tagged records to unit HLR_1, which thereby can update its registers that have been loaded from backup unit BAK_1.

Figure 3:
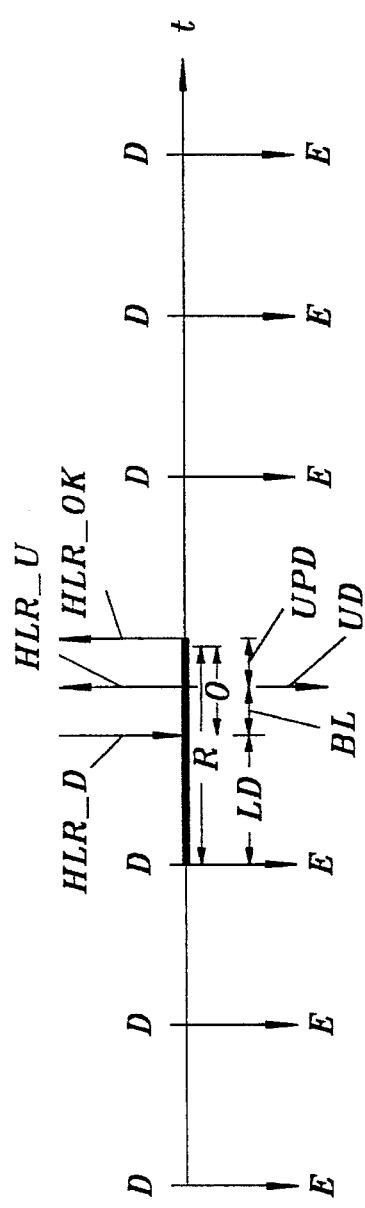
FIG. 3 shows a time diagram of events occurring in connection with a HLR crash handled in accordance with the method of the present invention.

Thus, in connection with a HLR crash the information in a HLR unit is destroyed. This information must therefore be recreated when the HLR unit is restored. FIG. 3 shows a time diagram of the events occurring in connection with a HLR crash handled in accordance with the present invention. Before the crash backup unit BAK_1 is updated at regular time intervals at points D in time. At point HLR_D the crash itself occurs. When the error has been corrected the backup copy is loaded from backup unit BAK_1. When this phase is completed the HLR unit may be restarted at point HLR_U. However, at point HLR_U when the backup copy has been loaded into the HLR unit this backup copy is no longer consistent, that is there are records that are no longer valid.

Firstly, a number of mobile stations have changed mobile services switching center (roaming) during the time interval LD between the latest position dump and the HLR crash. These changes, however, are registered in redundance register R_REG_1 and in operative register O_REG_2 in unit HLR_2 and can be identified as those records in this register that have a tag in the R field but not in the O field. The corresponding records may therefore be updated in operative register O_REG_1 and in redundance register R_REG_2 over connection C_HLR.

Secondly, a number of mobile, stations have changed mobile services switching center during the crash itself, that is during time period BL. Also in this case the corresponding records have been updated both in redundance register R_REG_1 and operative register O_REG_2 in unit HLR_2. These records can be identified by having a tag in both the R and O fields and can update corresponding records in registers O_REG_1 and R_REG_2, respectively, over connection C_HLR.

The updating of these inconsistent records in registers O_REG_1 and R_REG_2 is performed during time period UPD in FIG. 3. At point HLR_OK unit HLR_1 is once again ready to regain control of "its own" mobile stations. In both HLR units there are counters that count the number of tagged records. During normal operation the contents of these counters vary between specific values (different for different HLR units). In connection with a HLR crash in unit HLR_1 this counter will significantly exceed the upper limit for unit HLR_2. When the counter in unit HLR_2 during the updating of records in unit HLR_1 once again reaches values below said upper limit, unit HLR_2 in accordance with a preferred embodiment will temporarily stop handling new requests from mobile stations associated with register R_REG_1. When all tagged records in register R_REG_1 have been sent to unit HLR_1 unit HLR_2 sends a message to unit HLR_1 indicating that the updating has been completed. The latter unit then takes over control of "its own" mobile stations. The interrupt in handling requests in connection with this transition is very short and is perceived as a temporary link disturbance by influenced units.

When the HLR unit has crashed at point HLR_D a backup copy is loaded during period BL as in the previously known method. However, during update period UPD there no longer is a new registration of each mobile station as in the previously known method. Instead only those records in the home location register that are no longer valid after downloading the backup copy are updated. This makes it possible to significantly reduce the updating time UPD as compared to the previously known method, in which all active mobile stations have to register.

The present invention is based on the insight that the vast majority of active mobile stations have not changed position data in connection with a HLR crash. Therefore the data that are obtained from the backup copy are valid for these stations. It is then unnecessary that these stations register once again and thereby unnecessarily load the HLR unit. What has to be updated are on the one hand those records that have been changed during time interval BL and on the other hand those records that have been changed during time period LD between the latest position dump and the HLR crash. Both these types of records are easy to identify in the "mirroring" HLR unit. Furthermore, the number of changes may be reduced by a reduction of the dump interval, for instance to 1 minute. This gives a further reduction of the interval UPD.

Figure 4:
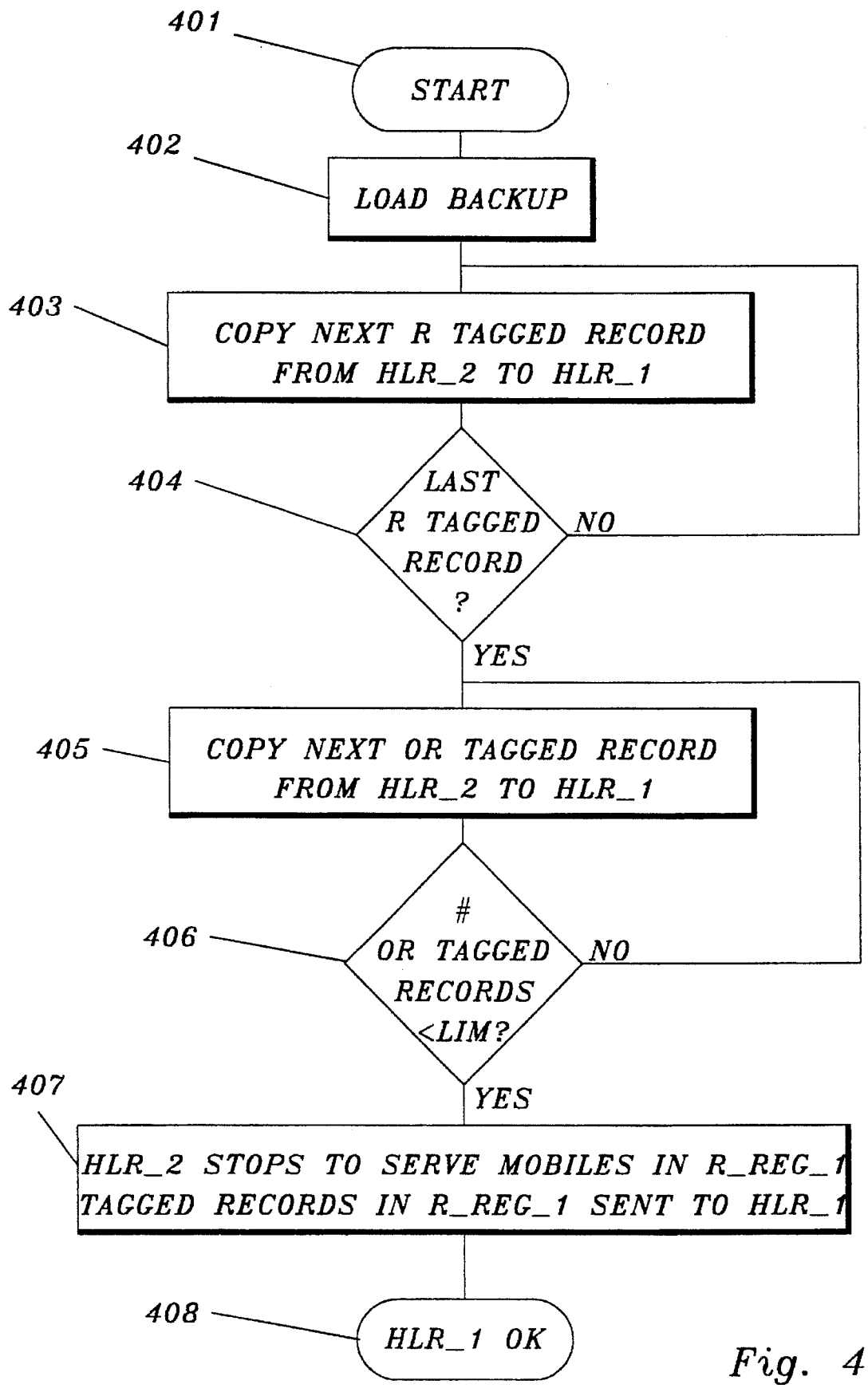
FIG. 4 shows a flow chart of the method of the present invention.

FIG. 4 shows a flow chart of the method in accordance with the present invention. In connection with a HLR crash in unit HLR_1 the updating of the home location register of the HLR unit is started in step 401. In step 402 the backup copy from backup unit BAK_1 is loaded. In steps 403, 404 the operative register O_REG_1 and redundance R_REG_2 are updated by transmitting R tagged records in registers R_REG_1 and O_REG_2, respectively, from unit HLR_2 to unit HLR_1. When these records have been handled the OR tagged records in registers O_REG_2 and R_REG_1 are updated on unit HLR_1 in steps 405, 406. When the number of OR tagged records falls below a predetermined value LIM, unit HLR_2 in step 407 stops to respond to requests from subscribers associated with register R_REG_1 and transmits the remaining records in register R_REG_1 to unit HLR_1. Thereafter unit HLR_1 is once again ready to control "its own" subscribers in step 407.

If a temporary link failure arises between unit HLR_1 and one or several of its mobile services switching centers, these may instead call unit HLR_2 and request that this unit takes control. Unit HLR_2 can determine that there is no HLR crash, since both HLR units still have contact with each other over connection C_HLR. The corresponding parts of the data base may now be updated by unit HLR_2 instead of HLR_1. When the link has been reestablished the corresponding mobile services switching centers may once again connect to unit HLR_1, and everything goes back to normal.

A modified form of the above described method for restoration of a crashed HLR_unit can also be used in the case where unit HLR_2 crashes before unit HLR_1 has been restored (multiple failure). In this case the records in the visitor location registers in the mobile services switching centers contain tags associated with units HLR_1 and HLR_2, respectively. When a mobile services switching center receives information on the fact that a position dump has been performed in one of the HLR units, the tag associated with this HLR unit is cleared. When HLR unit HLR_1 after a crash has loaded its backup copy and is to update its data base from unit HLR_2, the latter unit will not respond due to the fact that this unit has also crashed. In this case unit HLR_1 can order all its mobile services switching centers to send the tagged records that are associated with the unit HLR_1. If unit HLR_2 is restarted before unit HLR_1 has been completely restored, it is ordered to wait until HLR_1 is restored. Thereafter unit HLR_2 may be restored over unit HLR_1 in the same way as has been described in connection with FIGS. 1 and 2.

Figure 5:
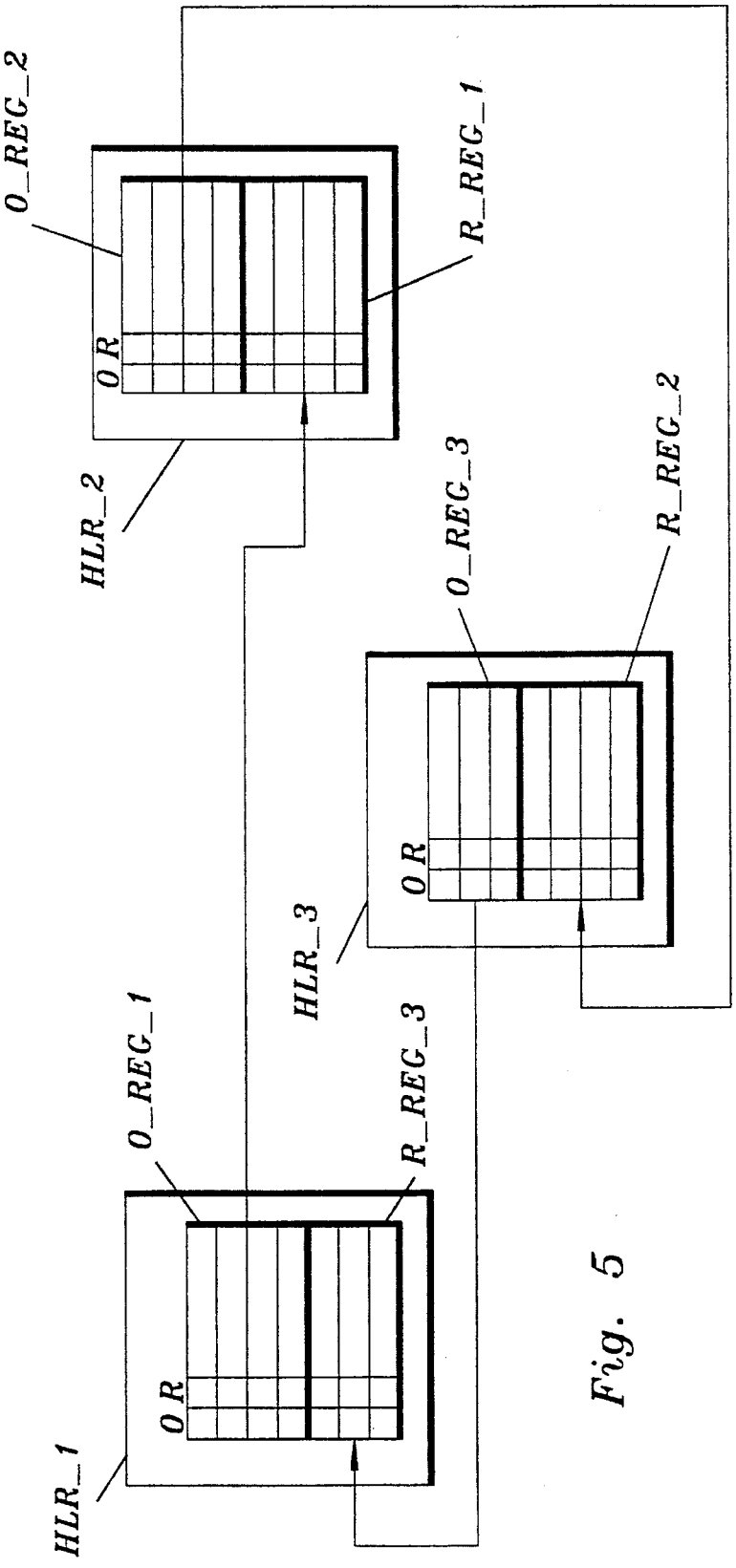
FIG. 5 shows a mobile telephone system in accordance with the invention with more than two HLR units.

FIG. 5 shows a mobile telephone system with three HLR units HLR_1, HLR_2, HLR_3. In this case these units mirror each other in a circular chain. Thus, redundance register R_REG_1 that mirrors the operative register O_REG_1 is located in unit HLR_2. However, unit HLR_1 does not mirror the operative register O_REG_2, as in the embodiment of FIGS. 1 and 2, but instead the operative register O_REG_3 of unit HLR_3. Register O_REG_2 is instead mirrored in redundance register R_REG_2 of unit HLR_3. A generalization to more than three HLR units is obvious.

The person skilled in the art realizes that different changes and modifications of the invention are possible within the scope of the invention, which is defined by the attached patent claims.

We claim:

1. A method of restoring a home location register after a home location register crash in a first home location register unit in a mobile radio system, said method comprising:

loading said first home location register with a previously saved backup copy; and updating, after loading said backup copy, records in said first home location register that are no longer valid with information from a second home location register unit that contains an up-to-date version of said first home location register, in which up-to-date version records that have changed after said backup copy was saved have been updated and tagged for later identification, thereby minimizing the update time of said first home location register by reducing the number of records that have to be updated in said first home location register to records that are no longer valid after loading said backup copy and correspond to said tagged records in said second home location register unit.

2. The method of claim 1, wherein the records in the first home location register that are no longer valid are updated with information from said up-to-date version of the home location register, said up-to-date versions being updated by the second home location register unit during the home location register crash and the loading of the backup copy.

3. The method of claim 2, wherein the up-to-date version of the home location register during normal operation is updated in synchronization with said first home location register through a connection between said first home location register unit and said second home location register unit, and said up-to-date version during the home location register crash and the loading of said backup copy is updated from mobile services switching centers that during normal operation update said first home location register in said first home location register unit.

4. A mobile radio communication system comprising at least a first and a second home location register unit with mobile services switching centers connected thereto, each home location register containing a backup unit from which a backup copy of the respective home location register can be loaded after a home location register crash, wherein said first home location register is loaded with a previously saved backup copy after the first home location register crashes, and after loading said backup copy, records in said first home location register that are no longer valid are updated with information from the second home location register which contains an up-to-date version of said first home location register, in which up-to-date version records that have changed after said backup copy was saved have been updated and tagged for later identification, thereby minimizing the update time of said first home location register by reducing the number of records that have to be updated in said first home location register to records that are no longer valid after loading said backup copy and correspond to said tagged records in said second home location register.

\* \* \* \* \*